Oct. 6, 1964  A. KREMER  3,151,421
LAPPING DEVICE

Filed Oct. 10, 1962  3 Sheets-Sheet 2

INVENTOR.
ALEX KREMER
BY
Ostrolenk, Faber, Gerb & Soffen
ATTORNEYS

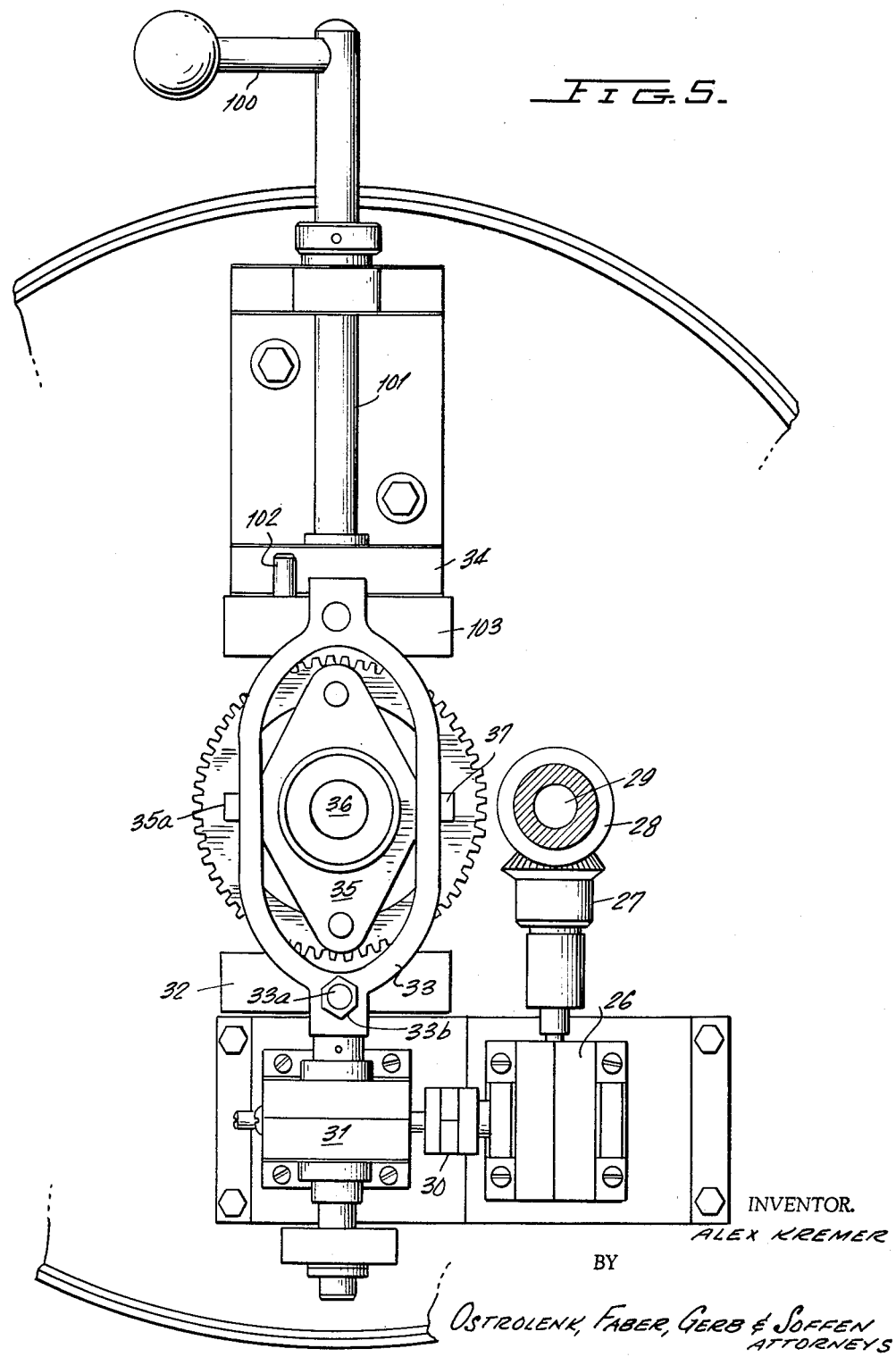

United States Patent Office 3,151,421
Patented Oct. 6, 1964

3,151,421
LAPPING DEVICE
Alex Kremer, Manhattan Beach, Calif., assignor to International Rectifier Corporation, El Segundo, Calif., a corporation of California
Filed Oct. 19, 1962, Ser. No. 229,708
5 Claims. (Cl. 51—161)

My invention relates to a novel lapping device wherein two surfaces of a wafer can be lapped to very close parallelism and wherein the operating mechanism for driving the materials to be lapped is so adjusted that wear on the driving teeth is considerably decreased.

Many applications require that the opposing surfaces of a flat member be lapped to provide a smooth, clean surface with the opposing surfaces being highly parallel. Such requirements exist in the manufacture of semiconductor devices where, for example, a silicon wafer must have its opposing surfaces lapped during stages of the manufacture of an electrical device which uses the silicon crystal body.

It is common practice to provide carriers formed of disks of spring steel which have gear teeth around their outer periphery to carry wafers at an eccentric opening thereof. This thin steel carrier is then caused to move with respect to upper and lower lapping surfaces by means of a pair of gears which engage the gear spring on its sides to move the spring carrier and the wafer carried therein with respect to lapping surfaces.

In semiconductor applications, this wafer thickness will be of the order of 0.020" and smaller, whereby an exceptionally thin spring steel carrier must be used. The gears which drive the spring carrier over the lapping surfaces, however, are generally thick driving gears whereby, in the past, the spring steel gear has worn notches into the driving gears at the point where the driving gears engage the spring steel gears.

The principle of the present invention is to provide a pair of driving gears for spring steel wafer carriers in a lapping device wherein the driving gears have relative axial motion with respect to the spring steel carrier, whereby the spring steel carrier engages different axial positions of the gear teeth of the driving gears during the lapping operation.

By way of example, the support structure carrying the driving gears may move in a reciprocating motion at a very low frequency, whereby over a period of ½ hour, the spring steel carrier will move axially relative to the driving gears over a distance slightly less than the full gear surface, and will thereafter return to complete the next half cycle in which the relative motion between the spring steel carrier and the driving gear reverses. In this manner, the wear on the driving gears is averaged over the complete surface of the driving teeth, whereby wear is considerably decreased and notches are not formed in the driving teeth.

Since mechanism is provided to produce relative axial motion between the spring steel carriers and the driving gears, as described above, this relative motion necessarily also exists between the driving gears and the lapping surface, or table, on which the spring steel carriers and wafers sit. Because of this, it has been recognized that the wafers may now be easily removed from the lapping table by merely causing the driving gears to move below the surface of the table, whereupon the thin and exceptionally fragile wafers can merely be slid off the table.

This is to be contrasted to the prior method of removing the lapped wafers from the lapping table wherein suction-cup devices, for example, were placed against the wafer in order to lift it. Where these wafers are semiconductor crystals, as mentioned above, a considerable amount of breakage was experienced in removing the wafers from the table, whereas when they can be slid off the side of the table, such breakage is avoided.

As a further feature of the invention, the reciprocating mechanism which causes the driving teeth to oscillate with respect to the lapping table surface can be provided with two inputs. The first input motion will be the normal and relativetly slow motion which takes place during a lapping operation. The second can be a high speed motion effected, for example, by an appropriate sharply contoured cam wherein the mechanism can be quickly lowered when it is desired to remove the wafers from the table in the manner discussed above wherein the wafers are merely slid off of the lapping surface.

Accordingly, a primary object of this invention is to provide a novel lapping device having long life.

Another object of this invention is to provide a novel lapping device wherein the driving gear teeth which engage the spring steel carriers do not have notches worn therein.

A further object of this invention is to provide a novel lapping device wherein thin, fragile wafers can be easily and safely removed from the lapping surface after the lapping operation is complete.

Another object of this invention is to provide a novel lapping device wherein the position of the gear driving mechanism can be lowered, either quickly or slowly, with respect to the level of the lapping surface, whereby either a controlled reciprocating motion can exist during lapping operation, or a quick drop action can be initiated when it is desired to remove the lapped wafers from the lapping device.

Another object of this invention is to provide a novel lapping device wherein wafers to be lapped are carried in an eccentric opening in a planetary gear.

These and other objects of this invention will become apparent from the following description when taken in connection with the drawings, in which:

FIGURE 5 is a top plan view of the platform assembly which imparts reciprocating motion to the driving gears which engage the spring disks of FIGURE 1 which move the wafers to be lapped with respect to the upper and lower lapping surfaces.

Figure 1:
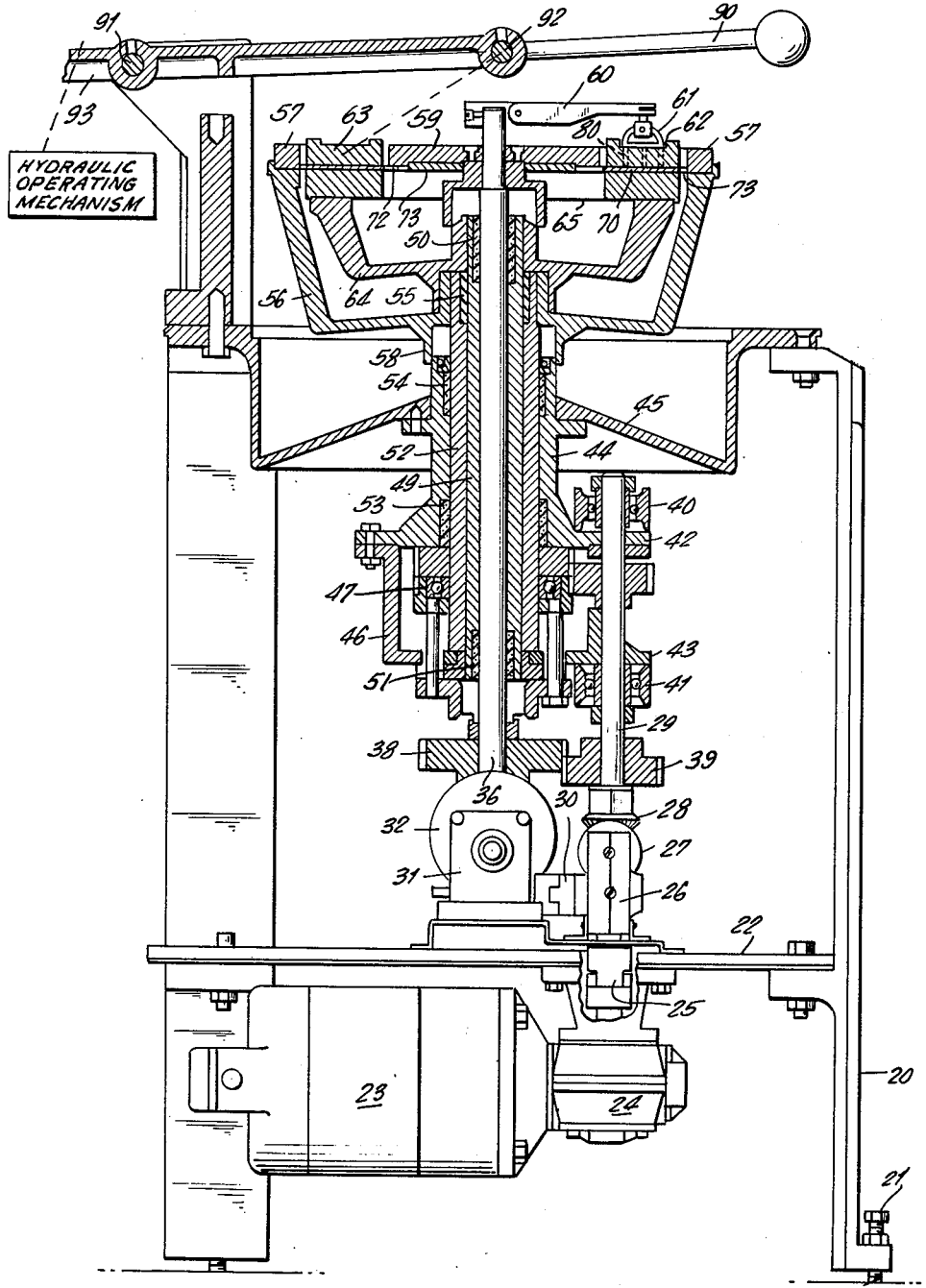
FIGURE 1 is a side view partially in cross-section of a lapping device constructed in accordance with the present invention.

Referring first to FIGURE 1, I have shown therein a side, partially cross-sectional view of the novel lapping device of the invention wherein the lapping device is contained within a metallic housing section 20 which has been partially cut away to illustrate the mechanism within the housing. The housing is provided with adjustable ground engaging bolts such as bolt 21, whereby the complete assembly can be appropriately leveled, and can be installed in a particular ground location.

Housing 20 has a platform 22 secured thereto in any desired manner wherein platform 22 contains support members which, along with other support members, carries motor 23 which supplies the power for operating the lapping device. Motor 23 has an output shaft which is redirected and reduced in speed by mechanism within housing 24 in the usual manner with the output of motor 23 being applied to coupler 25.

The output from coupler 25 is then connected to drive shaft 29 which has a miter gear 28 which meshes with miter gear 27. The output from miter gear 27 enters speed reducer 26 having an output to a coupler 30 which, as its best seen in FIGURE 5, is connected to speed reducer 31.

The speed reducer 31 then has its output connected to cam 32 whose cam surface engages a vertically adjustable yoke pin 33a locked into position by lock nut 33b.

The lateral position of yoke bearing 33 is then secured in any desired manner, whereby the lower end of the yoke bearing 33 in FIGURE 5 is vertically adjustable, for example, over a range of ½" in ½ hour when motor 23 operates to drive cam 32 through the various speed reducers in the system.

The upper side of yoke bearing 33 in FIGURE 5 is then supported on a second cam 34, as will be described more fully hereinafter, wherein cam 34 serves as a quick motion cam which can move the yoke bearing through a relatively wide throw in a short time.

Yoke bearing 33 then supports a bearing structure 35 by the pivot members 35a and 37 where bearing 35 rotatably receives a shaft 36 which is axially rotatable with respect to bearing 35 and is axially supported by bearing 35. Accordingly, the position of cam 32 will cause shaft 36 to adjust its axial height. Shaft 36 then has a gear 38 secured thereto as by keying, the gear 38 being driven by a gear 39 carried on shaft 29. Thus, the shaft 36 will be rotated in its bearing 35 of FIGURE 5, while its axial height is adjusted by the cam 32, whereby the shaft 36 will execute a rotary motion and a reciprocating motion.

The shaft 29 which carries gear 39 is supported in bearings 40 and 41 which are each carried by stationary flange portions 42 and 43 respectively of the stationary flange sleeve 44. The stationary sleeve 44 is bolted to the reentrant shaped cover 45 which is, in turn, bolted to the sides of housing 20. The stationary member 44 further has an extending portion 46 bolted thereto to carry a bearing 47 for shaft 36.

The stationary member 46 then supports a stationary hollow tube 49 which extends upwardly and into the lapping structure. The tubular member 49 is provided with upper and lower bearing members 50 and 51, respectively, which permit the stationary member 49 to rotatably receive shaft 36 which extends upwardly through stationary tubular member 49.

A second sleeve 52 which is rotatable about its axis is then formed concentrically with respect to stationary tubular member 49, and is rotatably supported with respect to stationary structure 44 by the bearings 53 and 54, respectively, as well as by bearing 55 which is interposed between the top portions of tubular members 52 and 49. The upper end of sleeve 52 is then secured to cup-shaped element 56 which carries the outer gear ring 57 at its rim.

The central portion of cup-shaped member 56 has an extending tubular section 58 which envelopes over the upper extending portion of stationary member 44, whereby the cup 56 may drop downwardly during operation.

The upper end of shaft 36 then terminates in the inner gear ring 59 and the wiper arm 60 which has a wiping section 61 which rides in slot 62 of top plate 63 to insure an even distribution of slurry, as will be described more fully hereinafter.

The operating shaft 36 is mechanically interlocked with respect to sleeve 52, whereupon as shaft 36 goes into its reciprocating motion because of cam 32, as previously described, the sleeve 52 and, thus, cup-shaped member 56 will execute a similar reciprocating motion.

A bottom plate cage 64 which is stationarily mounted with respect to the main support structure then carries the bottom plate 65.

Figure 3:
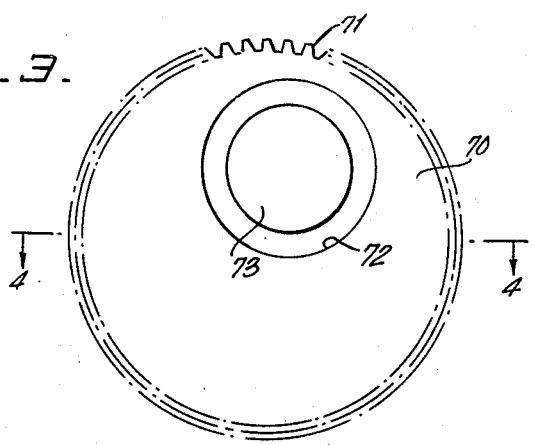
FIGURE 3 is a top view of a spring carrier gear having a wafer positioned in an eccentric opening thereof.
Figure 4:
FIGURE 4 is a side cross-sectional view of FIGURE 3 taken across the lines 4—4 in FIGURE 3.

It will be noted that the supports for the cage 64 are formed by its upper connection to stationary sleeve 49. The top plate 63 then has its lower surface in registry with the upper surface of bottom plate 65, as shown, whereby the material to be lapped is interposed between these adjacent surfaces of plates 63 and 65. More specifically, and as is illustrated in FIGURE 1, a spring steel disk 70 which has gear teeth around the outer periphery thereof, which mesh with the gear teeth of gear rings 57 and 59, are driven around the periphery of the lapping surfaces by the motion of the driving gears 57 and 59. A plurality of such spring carriers will be distributed around the periphery of the top and bottom plate adjacent faces. A typical spring carrier is illustrated in FIGURES 3 and 4 as carrier 70 having outer gear teeth 71 and an inner eccentric opening 72.

The material which is to be lapped such as a silicon crystal wafer 73 is disposed within opening 72 where the thickness of the wafer 73 is necessarily greater than the thickness of spring carrier 70.

Figure 2:
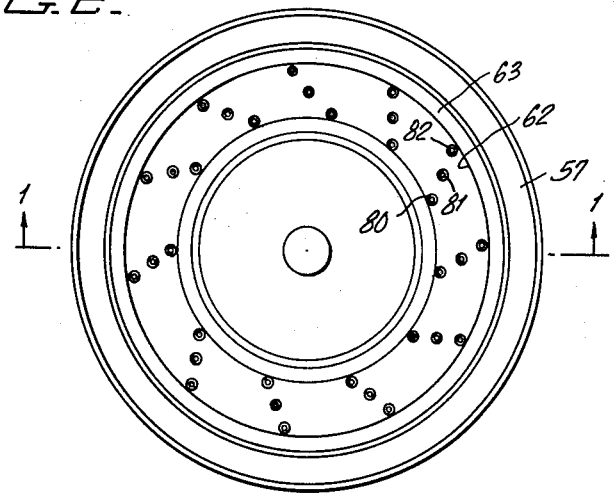
FIGURE 2 is a top view of the top plate of FIGURE 1.

A top view of plate 63 is shown in FIGURE 2 wherein plate 63, as shown in cross-section in FIGURE 1, has the groove 62 which receives the wiper 61 of wiper arm 60. The top plate 63, in accordance with the invention, is provided with a plurality of openings such as openings 80, 81 and 82 which permit a slurry applied to the groove 62 to pass through openings such as openings 80, 81 and 82 and into the lapping area. The wiper 61 assures that the slurry which is applied in the usual manner from some outside source is equally distributed over the total surface area of notch 62, and, thus, that an equal amount of slurry flows over the whole area of the lapping surface.

As has been previously indicated, a lapping device normally had no relatively axial motion between the driving gears such as gears 57 and 59 and the spring carrier 70. Because of this, the spring carriers would cut deep notches into the driving gears so that the lapping devices required frequent maintenance. In accordance with the present invention, however, the cam 32 of FIGURES 1 and 5 cause shaft 36 and, thus, gears 57 and 59 to execute a reciprocating motion which could amount, for example, to an amplitude of ½" in a time period of ½ hour. Because of this, the spring gear 70 will continually engage different axial portions of the driving gear so that the wear of the driving gears is distributed over their full faces and a notch will not be worn into the driving gears.

Moreover, there is also relative movement between gears 38 and 39 by virtue of the motion of shaft 36 so that these gears must be provided with faces which are broad enough to assure their continuous meshing throughout the maximum reciprocal motion of shaft 36.

The top plate 63 must be raised and lowered in order to move the spring carriers and their wafers onto the top of the bottom plate 65. To this end, a manual crank 90 which is pivoted at fixed pivot 91, is provided with parallel extending bars (not shown but schematically illustrated in the dotted line connection from pivot 92 to plate 63) which are pivotally fastened to pivot 92 of crank 90 and extend downwardly to clamp on opposing sides of top plate 63. Where desired, the crank 90 can continue to extend beyond pivot 91, as partially shown by extension 93, which extension can be connected to an hydraulic operating mechanism as schematically indicated in FIGURE 1, whereby the top plate 63 can be hydraulically actuated between a lifted and an operating position.

In order to unload the wafers and spring carriers, it has been previously necessary to use suction-cup type devices, for example, to receive the wafers and lift them from the top of bottom plate 65.

In accordance with the present invention, however, and as is illustrated in FIGURE 5, a quick operating cam 34 can be operated by crank arm 100 in FIGURE 5, which is secured to shaft 101 secured to cam 34. The cam 34 picks up a pin 102 which is secured to support 103 for the upper end, FIGURE 5, of yoke bearing 33, whereby rotation of arm 100 over 90° can cause the yoke bearing 33 and, thus, shaft 36 to execute its full reciprocal motion. This would then cause the shaft 36 to be completely depressed, whereby the upper surface of both gear 59 and gear 57 would move below the top of lower plate 65. The lapped wafers can be then be unloaded by merely moving them inwardly or outwardly of the surface and onto a flat wafer receiving means. Since it is now possible to slide the wafers off of the lapping surface, they can be unloaded in a quick and safe manner.

Although I have described preferred embodiments of my novel invention, many variations and modifications will now be obvious to those skilled in the art, and I prefer, therefore, to be limited not by the specific disclosure herein but only by the appended claims.

I claim:

1. A lapping machine comprising an upper lapping plate, a lower lapping plate, an outer driving gear, and an inner driving gear; said upper and lower lapping plates being adapted to receive a relatively thin carrier gear which carries material to be lapped with respect to the lapping surfaces of said upper and lower lapping plates; said outer driving gear engaging said thin carrier gear at a first portion thereof; said inner driving gear engaging said thin carrier gear at a portion 180° away from said first portion; said inner and outer driving gears being relatively thick with respect to said relatively thin carrier gear; and reciprocating means connected to each of said inner and outer driving gears; said reciprocating means causing said inner and outer driving gears to execute a reciprocating motion in an axial direction whereby wear over the teeth of said inner and outer driving gears is distributed over the major portion of the width of their teeth; and auxiliary reciprocating means connected to at least one of said inner or outer driving gears; said auxiliary reciprocating means being operable to axially move said one of said driving gears below the surface of said lower lapping plate whereby said carrier gear and the material carried therein can be slid off of said lower lapping plate.

2. A lapping machine comprising an upper lapping plate, a lower lapping plate, an outer driving gear, and an inner driving gear; said upper and lower lapping plates being adapted to receive a relatively thin carrier gear which carries material to be lapped with respect to the lapping surfaces of said upper and lower lapping plates; said outer driving gear engaging said thin carrier gear at a first portion thereof; said inner driving gear engaging said thin carrier gear at a portion 180° away from said first portion; said inner and outer driving gears being relatively thick with respect to said relatively thin carrier gear; and reciprocating means connected to each of said inner and outer driving gears; said reciprocating means causing said inner and outer driving gears to execute a reciprocating motion in an axial direction whereby wear over the teeth of said inner and outer driving gears is distributed over the major portion of the width of their teeth; said upper lapping plate having an annular slurry-receiving depression in the upper surface thereof and a plurality of openings extending through said upper plate in the region of said depression; and a wiper arm; said wiper arm being rotatable in said depression to insure appropriate distribution of said slurry.

3. A lapping machine comprising an upper lapping plate, a lower lapping plate, an outer driving gear, and an inner driving gear; said upper and lower lapping plates being adapted to receive a relatively thin carrier gear which carries material to be lapped with respect to the lapping surfaces of said upper and lower lapping plates; said outer driving gear engaging said thin carrier gear at a first portion thereof; said inner driving gear engaging said thin carrier gear at a portion 180° away from said first portion; said inner and outer driving gears being relatively thick with respect to said relatively thin carrier gear; and reciprocating means connected to each of said inner and outer driving gears; said reciprocating means causing said inner and outer driving gears to execute a reciprocating motion in an axial direction whereby wear over the teeth of said inner and outer driving gears is distributed over the major portion of the width of their teeth; said reciprocating motion having an excursion of the order of ½ inch in the order of ½ hour; and auxiliary reciprocating means connected to at least one of said inner or outer driving gears; said auxiliary reciprocating means being operable to axially move said one of said driving gears below the surface of said lower lapping plate whereby said carrier gear and the material carried therein can be slid off of said lower lapping plate; said auxiliary reciprocating means being substantially faster in operation than said reciprocating means.

4. A lapping machine comprising an upper lapping plate, a lower lapping plate, an outer driving gear, and an inner driving gear; said upper and lower lapping plates being adapted to receive a relatively thin carrier gear which carries material to be lapped with respect to the lapping surfaces of said upper and lower lapping plates; said outer driving gear engaging said thin carrier gear at a first portion thereof; said inner driving gear engaging said thin carrier gear at a portion 180° away from said first portion; and auxiliary reciprocating means connected to at least one of said inner or outer driving gears; said auxiliary reciprocating means being operable to axially move said one of said driving gears below the surface of said lower lapping plate whereby said carrier gear and the material carried therein can be slid off of said lower lapping plate.

5. A lapping machine comprising an upper lapping plate, a lower lapping plate, an outer driving gear, and an inner driving gear; said upper and lower lapping plates being adapted to receive a relatively thin carrier gear which carries material to be lapped with respect to the lapping surfaces of said upper and lower lapping plates; said outer driving gear engaging said thin carrier gear at a first portion thereof; said inner driving gear engaging said thin carrier gear at a portion 180° away from said first portion; said upper lapping plate having an annular slurry-receiving depression in the upper surface thereof and a plurality of openings extending through said upper plate in the region of said depression; and a wiper arm; said wiper arm being rotatable in said depression to insure appropriate distribution of said slurry.

References Cited in the file of this patent

UNITED STATES PATENTS

| | | |
|---|---|---|
| 2,369,107 | Indge | Feb. 6, 1945 |
| 3,063,206 | Meyerhoff et al. | Nov. 13, 1962 |